May 2, 1967

J. R. RAPER, JR., ET AL 3,316,636

POWER OPERATED CUTTING KNIFE

Filed May 3, 1966

INVENTORS
JULIAN R. RAPER, JR.
JAY G. TAUSENDFREUNDT
BY

Kirschstein, Kirschstein & Ohrlinger

ATTORNEYS

May 2, 1967
J. R. RAPER, JR., ETAL
3,316,636
POWER OPERATED CUTTING KNIFE
Filed May 3, 1966
2 Sheets-Sheet 2
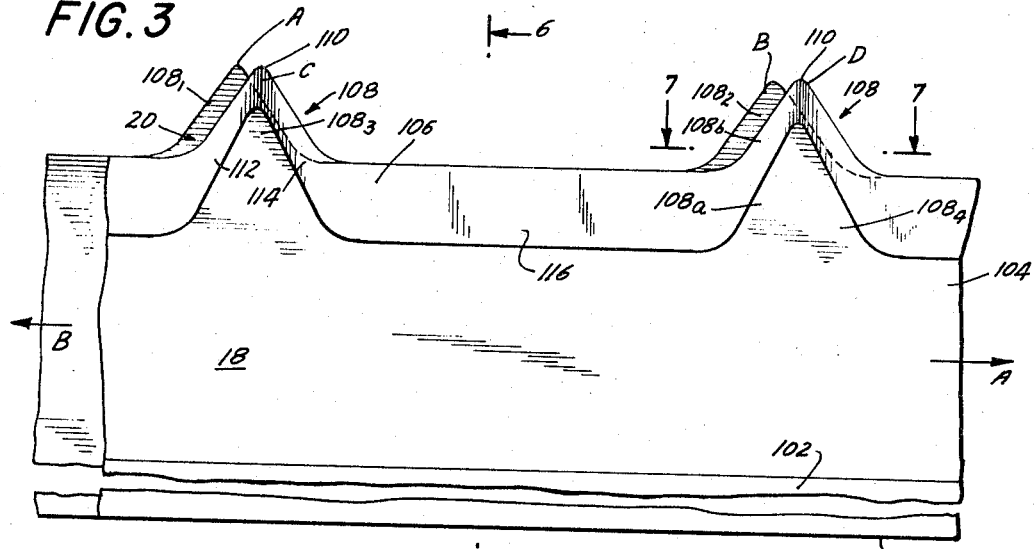
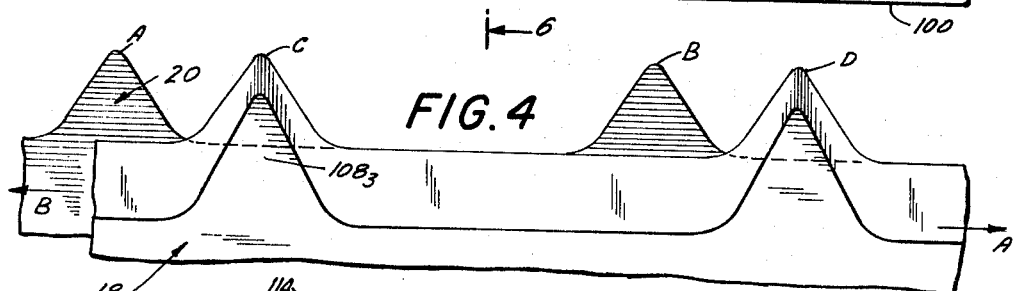
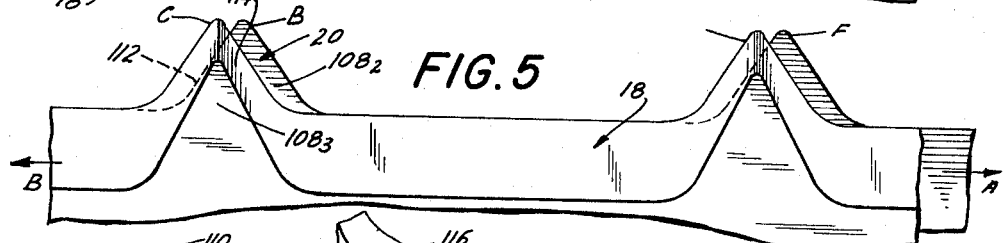
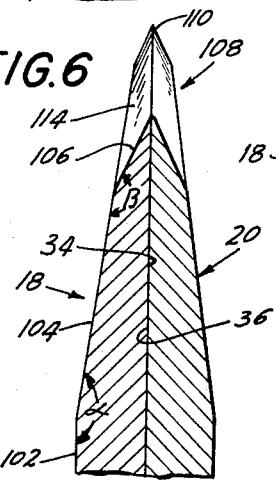
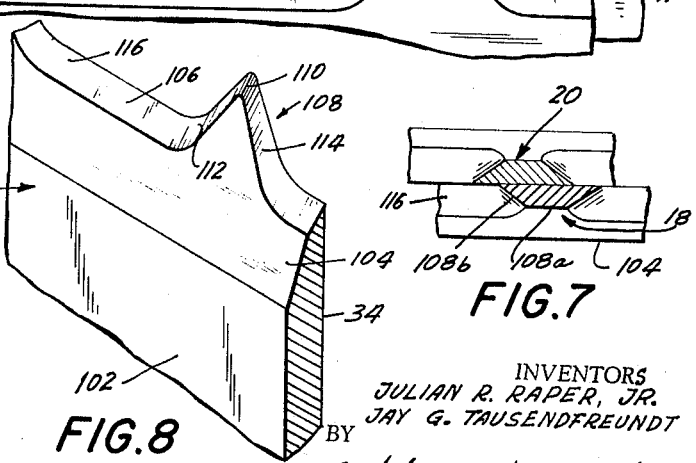
INVENTORS
JULIAN R. RAPER, JR.
JAY G. TAUSENDFREUNDT
BY Kirschstein, Kirschstein & Ollinger
ATTORNEYS

United States Patent Office 3,316,636
Patented May 2, 1967

3,316,636
POWER OPERATED CUTTING KNIFE
Julian R. Raper, Jr., Barrington, and Jay G. Tausendfreundt, Bristol Ferry, R.I., assignors to Imperial Knife Associated Companies, Inc., Providence, R.I., a corporation of Rhode Island
Filed May 3, 1966, Ser. No. 547,243
10 Claims. (Cl. 30—210)

This invention relates to a power operated cutting knife, and more particularly to new and improved reciprocating cutting blades for such a knife.

It is the primary object of the invention to provide, for a power operated cutting knife of the type designed to be manually guided for accomplishing conventional food cutting chores in the home, a pair of new and improved reciprocating cutting blades which slice hot and cold foods in an improved manner, and which make an unusually clean cut through soft food items such as bread, tomatoes, and other items that tend to be crushed or pulped by the blades of other knives.

It is another object of the invention to provide, for a power operated cutting knife of the character described, a pair of reciprocating cutting blades, each of which has a cutting edge characterized by the provision of a series of like cutting elements, which cutting elements are uniformly spaced apart by sharpened reaches, the blades when incorporated into a cutting knife cutting through foodstuffs in a particularly neat, quick and efficient manner due to the slicing ability of the cutting edges.

It is still another object of the invention to provide, for a power operated cutting knife of the character described, a pair of reciprocating cutting blades having a series of spaced tapered teeth and powered drive means relatively counter-reciprocating the blades, said reciprocating means moving each blade through a stroke and the teeth of blades being spaced so that the peaks of the teeth on one blade do not pass by, but rather stop short of, the peaks of the teeth of the other blade and then initiate a counter-stroke whereby a "slotting" action by the teeth takes place resulting in rapid passage of the cutting blades through any foodstuff desired to be cut.

These and various other objects and advantage of the invention will become apparent to the reader in the following description.

The invention accordingly consists in the features of construction, combinations of elements and arrangements of parts which will be exemplified in the devices hereinafter described, and of which the scope of application will be indicated in the appended claims.

In the accompanying drawings in which are shown various possible embodiments of the invention, FIG. 1 is a perspective view of a power operated cutting knife including the new and improved reciprocating cutting blades;

FIG. 3 is a greatly enlarged fragmentary elevational view of a section of the cutting blades in face-to-face sliding contact;

FIGS. 4 and 5 are views similar to FIG. 3 but showing various relative positions of the cutting blades during oscillation thereof;

Figure 9:
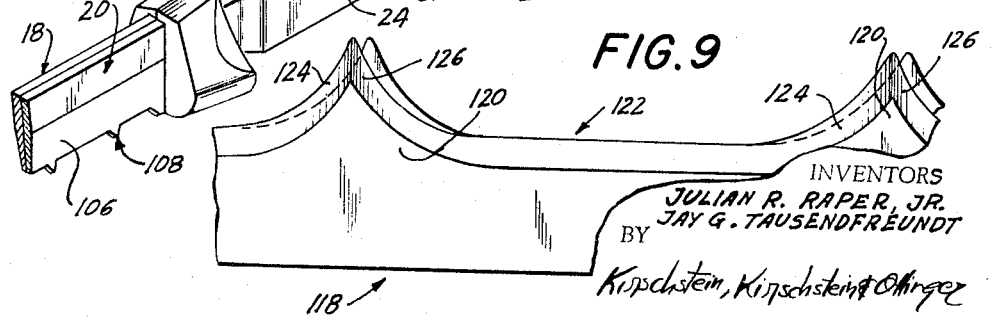

FIGS. 6 and 7 are cross-sectional views taken substantially along the lines 6—6 and 7—7 of FIG. 3;

FIG. 8 is a greatly enlarged perspective view of a small section of one of the cutting blades illustrating its cutting edge, including a cutting element and a linear cutting reach; and FIG. 9 is a fragmentary elevational view of a section of a second embodiment of the cutting blades.

In general and in accordance with the teaching of the invention, there is provided a power operated cutting knife which is lightweight and portable, electrically powered, and which is to be used for conventional food cutting chores in the home. A pair of elongated reciprocating cutting blades is provided for the cutting knife, and means is provided within the housing of the cutting knife to removably receive the blades. Means is also provided to rapidly counter-reciprocate said cutting blades.

The cutting blades are held in sliding face-to-face contact with one another and are counter-reciprocated alternately forwardly and rearwardly along a common axis. That is, as one blade is driven in one direction along said axis, the other blade is driven in an opposed direction.

Each cutting blade has a configuration which is the mirror image of the other blade and each cutting blade has an elongated continuous cutting edge which is composed of a series of like cutting elements and a series of like linear reaches. Each adjacent pair of cutting elements is separated by a reach. The cutting elements constitute triangularly shaped sharpened teeth, and in one form of the invention the converging sides of the triangular teeth are linear while in other forms they are outwardly concave and/or outwardly convexed. The reaches of the cutting edges lie along a straight line parallel to said common axis.

The cutting edges and the reciprocating means are arranged so that the blades while moving in opposite directions have each peak of their cutting elements on any one blade move between peaks of a pair of cutting elements on the other blade, but no tooth peak ever passes any other peak. Rather, said peaks stop short of one another, before moving in an opposed direction.

The aforesaid stroke of the cutting blades cuts, in effect, discontinuous adjacent slots in the foodstuffs being sliced, each slot being formed by the stroke of a tooth, and the space between the adjacent slots is cut by teeth or reaches upon the next stroke of the blades. This arrangement has been found to enable the cutting knife to pass through foodstuffs in an especially clean, easy, quick and efficient manner. It does not mince or chop foodstuffs by having clashing tips of the teeth pass back and forth rapidly over one another within foodstuff.

Figure 1:
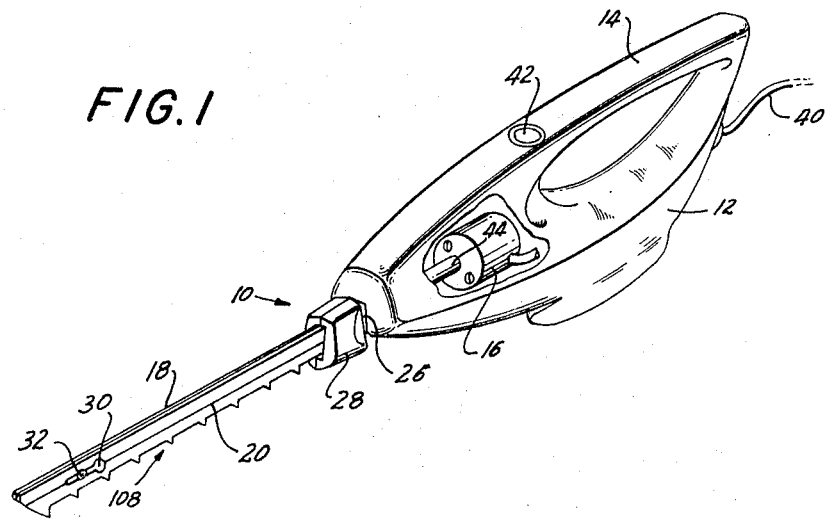

Referring now in detail to the drawings, and especially to FIG. 1, the reference numeral 10 denotes an electrically operated cutting knife of the type which is portable and manually manipulatable for accomplishing the cutting of foodstuffs in the home. The cutting knife includes a housing 12 having formed in one piece therewith a handle portion 14. An electrical motor 16 is mounted within the housing.

Two cutting blades, arbitrarily designated as a right blade 18 and a left blade 20, the same constituting a pair of blades, protrude from the housing 12. The blades 18, 20 are elongated and each blade includes at its rearward end a tang, respectively 22, 24 (see FIG. 2). The tangs 22, 24 fit into and are engaged within the housing 12 through an opening 26 at the front of the housing. Each blade includes a guard 28 located at the junction of the tang with the cutting portion of the blade, the same preventing grease and food juices from entering the housing.

The blades 18, 20 are held in inner face to inner face sliding contact and for this purpose, at the forward ends of the blades, a keyhole slot 30 is formed in one of the blades and the other blade carries a rivet 32 which is captive in and which can slide back and forth in the keyhole slot 30.

The mentioned slot and rivet 30, 32, and the reciprocating drive mechanism, soon to be described, hold the blades in juxtaposed sliding contact. Each of the blades has a flat inner side face, the blade 18 having an inner side face 34 and the blade 20 having an inner side face 36 and these side faces slide in juxtaposed contact over one another as the blades 18, 20 relatively reciprocate.

Figure 2:
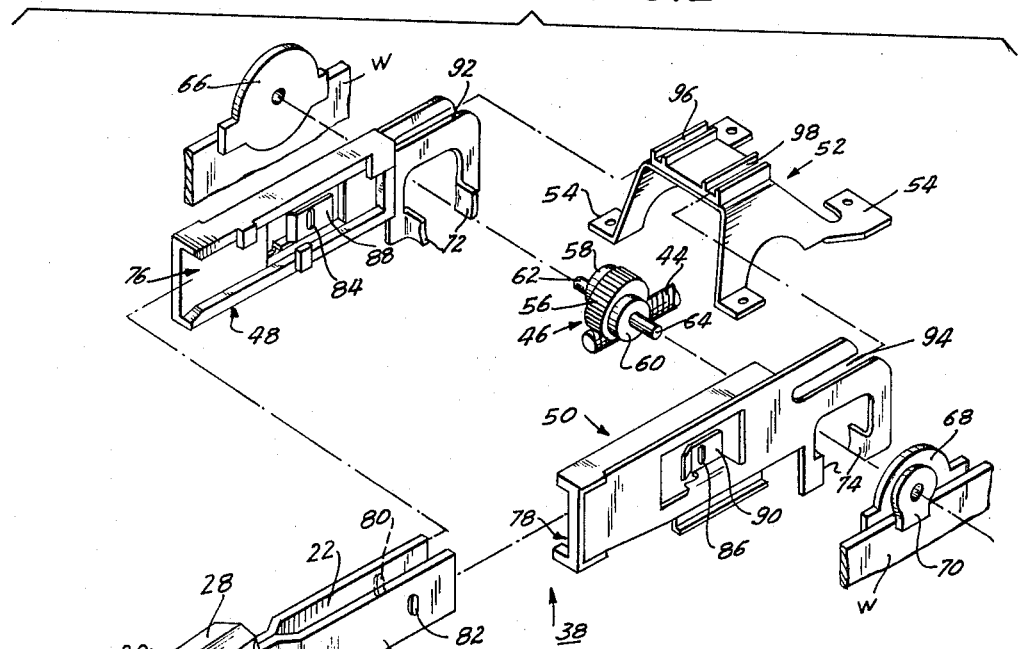
FIG. 2 is an exploded view of the tangs of the cutting blades, the means for receiving the blades and the means for reciprocating said blades.

Means removably receiving the tangs 22, 24 of the blades and drivingly counter-reciprocating said blades are illustrated in FIG. 2, and are denoted by the reference numeral 38. The motor 16 powers the means 38, and a convenience cord 40, running from the motor, energizes said motor from an electrical wall outlet in the home. The energizing circuit for the motor is controlled by a push-switch 42 mounted on the housing 12. The motor 16 has a drive shaft 44 with a worm gear on the forward portion thereof. When the motor 16 is energized, the drive shaft 44 rotates and operates the means 38.

The receiving and reciprocating means 38 includes a crank-wheel 46 and a pair of tang-receiving connecting rods, the rod 48 receiving the tang 22 and the rod 50 receiving the tang 24. The rods 48, 50 slide in longitudinal grooves (not shown) formed internally of the housing 12 and are, in addition, slidingly captured by a yoke 52 which is fixed at four feet 54 to an internal wall of the housing 12.

The crank-wheel 46 includes a central worm wheel 56 which meshes with the worm of the drive shaft 44. The crank-wheel 46 further includes a pair of oppositely offset eccentric circular cams 58, 60 and a pair of trunnions 62, 64, each trunnion projecting axially from a different cam. The crank-wheel 46 is supported within the housing 12 for rotation about a fixed axis transverse to the axis of the drive shaft 44 by bearings, respectively 66, 68 each receiving a different trunnion. Said bearings are secured to internal walls W of the housing, being hold in proper location by overhanging lips 70. At the rear of each of the rods 48, 50, a pair of guide fingers 72, 74 is formed. The cams 58 and 60 each mate with and rotate within a different pair of guide fingers so that upon rotation of the crank-wheel 46, the rods 48, 50 are driven forwardly and rearwardly by the cams in short counter-reciprocating strokes. Since the cams are oppositely offset by 180°, as one blade is driven forwardly, the other is driven rearwardly and vice-versa.

The facing sides of the rods 48, 50 each defines an open groove, respectively 76, 78, into which the tangs 22, 24 are slidably insertable. Each tang carries on its outward face, a small nib, respectively 80, 82, and when the tangs are inserted into the grooves of the connecting rods, each nib is received by a slot, respectively 84, 86, formed in a resilient inwardly-biased spring clip, respectively 88, 90, in each of the connecting rods. The clips are arranged so that when the tangs are pushed into the grooves 76, 78 in the connecting rods, the tangs will first push the clips 88, 90 to one side and then upon continued movement, enter into the slots 84, 86 within the clips, said clips thereupon retaining the tangs in their proper position in the respective connecting rods.

A rearwardly open axial slot, respectively 92, 94, is formed at a portion of each of the connecting rods and a pair of grooves, respectively 96, 98 is formed on top of the yoke 52. The slots 92, 94 have their top defining walls slide back and forth in the grooves 96, 98 and their bottom defining walls pass underneath the top wall of the yoke. The general construction of the just described means receiving the blades and driving means for reciprocating the same is conventional. However, as will shortly be pointed out, the specific throw imparted to the blades as well as the relative movements of the blades is unique and critical to our invention.

The configuration of each of the blades is best illustrated in FIGS. 3, 4, 5, 6, 7 and 8. Each of the blades 18, 20 is a mirror image of the other blade and, accordingly, only one blade need be described in detail. The blade 18 exemplificatively includes the inner side face 34, an elongated linear blunt bottom edge 100 and an outer side face 102. The outer side face has formed thereon a face relief bevel or hollow ground surface 104 and the cutting edge of each of the blades is sharpened by a cutting edge bevel 106 which is continuous along the entire cutting edge of each of the blades. The face relief bevel 104 forms an obtuse angle ($\alpha$ in FIG. 6) with the side face 102, and the cutting edge bevel 106 forms an obtuse angle ($\beta$ in FIG. 6) with the face relief bevel 104, the combination of said bevels permitting the cutting blade to have a sufficiently thick body to maintain its strength, but yet forming a sharp cutting edge.

The cutting edge of each of the blades is continuous along the length thereof and said cutting edges are closely adjacent one another. Each edge includes a series of uniformly spaced cutting elements, said cutting elements constituting like triangularly shaped cutting teeth 108. A portion of each cutting tooth is formed by a segment 108a (see FIG. 3) of the face relief bevel 104 and by a segment 108b of the cutting edge bevel 106. All of the teeth 108 are identical, it being understood that each blade carries on its cutting edge a series of similar and uniformly spaced teeth 108, with the flat facing inner side faces 34, 36 of the blades 18, 20 also constituting the facing portions of the teeth 108. Each of the teeth 108 includes a peak 110 which may be slightly rounded in elevation and a pair of sloping generally flat linear side linear side faces, respectively 112, and 114. Said side faces are formed by the cutting edge bevel 106.

Separating the teeth 108 are linear reaches 116, the ends of the reaches smoothly fairing into the bounding faces of the teeth 108. The lengths of all reaches 116 are the same, and each reach has the cutting edge bevel 106 formed thereon, so that the reach 116 is sharpened and constitutes a portion of the continuous cutting edge of each of the cutting blades.

The length of each reach is at least equal to the breadth of the base of a tooth, i.e., the maximum distance between the side faces 112, 114 of a tooth, and in the embodiment shown, each reach is about twice the breadth of the base of a tooth. The tips 110 of the teeth and the reaches, respectively, lie along lines which are parallel, and are parallel to the axis along which the knives reciprocate.

The aforedescribed configuration of the cutting blades, and particularly their cutting edges, characterized by a series of spaced cutting teeth with a sharpened reach between each pair of teeth, provides, for a power operated cutting knife, a pair of reciprocating cutting blades which has been found to be highly efficient in cutting cleanly through foodstuffs. The action of the blades in passing through and slicing foodstuffs has been found to be highly efficient, quick and neat. Further, said cutting configuration enables the reciprocating blades to cut through both hard and soft foods with equal ability.

The crank-wheel 46 and the connecting rods 48, 50 previously described, are arranged and dimensioned so that in each cycle of operation, each cutting blade moves along a common axis, first forwardly and then rearwardly. The blades move in opposed directions, or if at the ends of their respective strokes are temporarily stationary, at any moment in time. The total stroke distance of each connecting rod and thus of each blade is equal to the total distance which the centers of the cams 58, 60 move longitudinally during the rotation of each cam from its forwardmost position to its rearwardmost position. The total relative stroke distance of the blades is, since the cams are of like dimensions, twice the total stroke distance of either connecting rod.

The said cams and the distance between peaks 110 of the teeth 108 are arranged so that during one cycle of operation no two peaks of teeth tips on different cutting blades cross, but, rather, said peaks move toward one another, terminate their movement immediately short of one another, so that the bases of the teeth of different blades partially overlap at the extremities of the strokes, and then move in opposed directions.

Said movement is most readily understood by a comparison of FIGS. 3, 4 and 5. In FIG. 3, the peaks A and B are on adjacent teeth 108₁ and 108₂ on the cutting blade 20, while the peaks C and D are on cutting teeth 108₃, 108₄ on the blade 18. The blades have just completed their respective strokes and are momentarily stationary. The peak A on blade 20 and the peak C on blade 18 are closely adjacent, i.e., are nearly transversely aligned. The peaks B and D are in similar relation. While the cutting edges of the side faces of the respective teeth 108₁, 108₃ and 108₂, 108₄ cross, yet the peaks of the respective teeth are somewhat spaced apart. Immediately after the moment frozen in FIG. 3, the cutting blade 18 will move in the direction indicated by the arrow A while the cutting blade 20 will move in the direction indicated by the arrow B. That is, the peak C will move in a direction opposed to the direction of movement of the peak A and the peak D will move in a direction opposed to the direction of movement of the peak B. A short time later, as shown in FIG. 4, the blade 18 has shifted in a direction indicated by the arrow A while the blade 20 has shifted in the direction indicated by the arrow B, so that the peaks A and C and the peaks B and D are respectively further apart than they were in FIG. 3. The peak C is now moving toward the peak B and the peak B is moving toward the peak C, while the peak D is moving toward a peak F rearwardly on the blade 20 and while the peak A is moving toward a peak (not shown) forwardly on the blade 18.

FIG. 5 illustrates the next succeeding momentarily stationary position of the blades wherein they have reached the other ends of their respective throws. Therein, the peak C has closely approached the peak B but has terminated its movement short thereof, i.e., before the teeth come into transverse alignment. The face 114 of the tooth 108₃ of which C is a peak, has crossed the face 112 of the tooth 108₂ of which B is the peak. Accordingly, it will be understood that since both blades are being reciprocated, the length of stroke of each blade is less than one-half the peak to peak distance between adjacent teeth on any one blade, but is greater than one-half of the length of any reach. Hence the peaks never pass over one another and thus do not, as they otherwise would, clash, chatter and vibrate nor do they, as they otherwise would, chop, mince and pulp foodstuffs.

In one commercially satisfactory embodiment of our invention, a motor 16 and crank-wheel 46 is provided such that the blades are driven at a rate of oscillation of between 1,400 and 3,600 oscillations per minute, or 2,800 to 7,200 strokes per minute. The cutting teeth are arranged so that between each adjacent pair of peaks, there is a distance of .400 inch and each blade experiences a stroke distance relative to the other blade of .375 inch, or an absolute stroke distance of .187 inch so that the peaks approach one another at the end of each stroke by about twelve thousandths of an inch.

In use, each tooth of each blade appears to cut a long slot during each stroke in the foodstuff being severed. Since the peaks do not cross, the ends of the bases of the cut slots do not meet. However, the uncut portion between adjacent slots is cut either by a sharpened reciprocating reach or by a reciprocating tooth during a subsequent stroke of the blades. The sharpened teeth easily enter into and cut any food as pressure is applied by the user. As the peaks of the teeth enter the foodstuff, the relative reciprocation imparted to the blades causes the sharpened sides of the teeth to slice through the food. The teeth are spaced close enough together to insure that all portions of the foodstuff in the cutting zone come into contact with the sides of the teeth. The teeth are spaced far enough apart to keep their number at a minimum, for ease of the peaks entering the food.

We have found that since the peaks never cross one another, they do not wear one another out by abrasion. Moreover, when the cutting edges become duller, particularly at the peaks, cutting is still effective because the blades squeeze the material to be cut between the peaks of the blades which approach one another but which never pass over one another. In other words, the principal cutting force holds the foodstuff being cut between adjacent teeth of different blades.

In FIG. 9, a segment of a second embodiment 118 of our reciprocating cutting blades is illustrated. Similarly to the first form, the cutting edge of each of the blades constitutes a series of cutting elements 120 separated by straight reaches 122, each adjacent pair of elements 120 being spaced apart by a single reach 122. In the second embodiment 118, however, the side faces 124, 126 of the cutting elements are outwardly concave, in contrast to the configuration of the side faces in the first embodiment wherein said side faces are substantially straight. The shape of the cutting edges of the second embodiment 118 also yields highly satisfactory results.

It thus will be seen that we have provided reciprocating cutting blades for a power operated cutting knife which achieve the several objects of our invention and which are well adapted to meet the conditions of practical use.

As various possible embodiments might be made of the above invention, and as various changes might be made in the embodiments set forth, it is to be understood that all matter herein described or shown in the accompanying drawings is to be interpreted as ilustrative and not in a limiting sense.

We claim:
1. A power operated cutting knife, said knife including a pair of elongated cutting blades, a housing, an electric motor, means selectively energizing said motor, a pair of members receiving and holding the blades, and means driven by said motor relatively counter-reciprocating the receiving members and thus the cutting blades along a common axis, said blades each having a flat inner side face, an outer side face, said inner side faces lying in a common plane and being held in sliding contact by the receiving members, an elongated cutting edge continuous along the length of each blade, the cutting edges of the blades being immediately adjacent one another, each cutting edge being a mirror image of the other and each including a series of uniformly spaced like fixed sharp peaked cutting teeth and sharp aligned reaches between each pair of adjacent teeth, said reaches having their respective major segments lying along a common line substantially parallel to the common axis, and cutting edge bevels on the reaches and teeth, said bevels being located only on the outer side faces of the blades, the bevels of the cutting edges sloping towards the common plane.

2. A power operated cutting knife as set forth in claim 1 wherein the counter-reciprocating means drive the receiving members, and thus the blades, each through a stroke having a length less than one-half of the peak-to-peak distance between adjacent teeth, the strokes being arranged so that each peak of any blade reciprocates between two adjacent teeth of the other blade and terminates its stroke short of passing the peaks of either of said adjacent teeth.

3. A power operated cutting knife as set forth in claim 2 wherein the reaches are linear.

4. A power operated cutting knife as set forth in claim 2 wherein the bases of the teeth of the different blades partially overlap at the extremities of the strokes of the blades.

5. A power operated cutting knife as set forth in claim 2 wherein the length of each reach is at least equal to the breadth of the base of a tooth.

6. A power operated cutting knife as set forth in claim 2 wherein the cutting teeth have a peak-to-peak distance of about 0.400 inch and are driven through a relative stroke of about 0.375 inch.

7. A power operated cutting knife as set forth in claim 6 wherein the counter-reciprocating means oscillates the blades at between about 2,800 to about 7,200 strokes per minute.

8. A power operated cutting knife as set forth in claim 2 wherein the sides of the cutting teeth are substantially linear.

9. A power operated cutting kinfe as set forth in claim 2 wherein the sides of the cutting teeth are outwardly concave.

10. A pair of reciprocable cutting blades for use in a power operated cutting knife, the knife including means for receiving and counter-reciprocating the blades along a common axis, said blades each having a flat inner side face, an outer side face, said inner side faces lying in a common plane and being held in sliding contact by the receiving members, an elongated cutting edge continuous along the length of each blade, the cutting edges of the blades being immediately adjacent one another, each cutting edge being a mirror image of the other and each including a series of uniformly spaced like fixed sharp peaked cutting teeth and sharp aligned reaches between each pair of adjacent teeth, said reaches having their respective major segments lying along a common line substantially parallel to the common axis, and cutting edge bevels on the reaches and teeth, said bevels being located only on the outer side faces of the blades, the bevels of the cutting edges sloping towards the common plane, the blades each being adapted to be driven through a stroke having a length less than one-half of the peak-to-peak distance between adjacent teeth, with the blades so arranged that each peak of any blade reciprocates between two adjacent teeth of the other blade and terminates its stroke short of passing the peaks of either of said adjacent teeth.

References Cited by the Examiner
UNITED STATES PATENTS

| | | | |
|---|---|---|---|
| 3,193,925 | 7/1965 | Hawley | 30—223 X |
| 3,203,095 | 8/1965 | Nelson | 30—216 X |
| 3,221,406 | 12/1965 | Knoll | 30—272 |

JAMES L. JONES, Jr., *Primary Examiner.*